(12) United States Patent
Yakabe et al.

(10) Patent No.: US 10,481,340 B2
(45) Date of Patent: Nov. 19, 2019

(54) OPTICAL CONNECTOR FERRULE AND OPTICAL CONNECTION STRUCTURE

(71) Applicant: Sumitomo Electric Industries, Ltd., Osaka-shi (JP)

(72) Inventors: Sho Yakabe, Yokohama (JP); Takuro Watanabe, Yokohama (JP); Kitao Takemoto, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/075,462

(22) PCT Filed: Feb. 8, 2017

(86) PCT No.: PCT/JP2017/004609
§ 371 (c)(1),
(2) Date: Aug. 3, 2018

(87) PCT Pub. No.: WO2017/138571
PCT Pub. Date: Aug. 17, 2017

(65) Prior Publication Data
US 2019/0049668 A1 Feb. 14, 2019

(30) Foreign Application Priority Data
Feb. 10, 2016 (JP) ................ 2016-023843

(51) Int. Cl.
*G02B 6/38* (2006.01)

(52) U.S. Cl.
CPC ......... *G02B 6/3818* (2013.01); *G02B 6/3822* (2013.01); *G02B 6/3826* (2013.01); *G02B 6/3882* (2013.01); *G02B 6/3885* (2013.01)

(58) Field of Classification Search
None
See application file for complete search history.

(56) References Cited

U.S. PATENT DOCUMENTS

| 5,082,378 A | 1/1992 | Muller et al. | |
|---|---|---|---|
| 2004/0223701 A1* | 11/2004 | Tanaka | G02B 6/3825 385/55 |
| 2012/0093462 A1 | 4/2012 | Childers et al. | |

(Continued)

FOREIGN PATENT DOCUMENTS

| CN | 202548374 U | 11/2012 |
|---|---|---|
| JP | H03-120504 A | 5/1991 |

(Continued)

*Primary Examiner* — Chad H Smith
(74) *Attorney, Agent, or Firm* — Baker Botts L.L.P.; Michael A. Sartori

(57) ABSTRACT

An optical connector ferrule comprises a body and a spacer. The body has a flat ferrule end surface facing a corresponding optical connector, and an optical fiber retaining hole opened in the ferrule end surface, an optical fiber being inserted and retained in the optical fiber retaining hole. The spacer is joined to the body, and at least a portion of the spacer is disposed on the ferrule end surface. The spacer defines an interval between the ferrule end surface and the corresponding optical connector, and includes an opening that allows an optical path extending from the optical fiber to pass therethrough.

15 Claims, 12 Drawing Sheets

(56) References Cited

U.S. PATENT DOCUMENTS

| | | | |
|---|---|---|---|
| 2012/0201494 A1* | 8/2012 | Suzuki | G02B 6/3508 385/16 |
| 2014/0133803 A1* | 5/2014 | Rosenberg | G02B 6/3885 385/33 |
| 2015/0104135 A1 | 4/2015 | Bushnell et al. | |

FOREIGN PATENT DOCUMENTS

| | | |
|---|---|---|
| JP | 2000-231030 A | 8/2000 |
| JP | 2004-145140 A | 5/2004 |
| JP | 2006-084498 A | 3/2006 |
| JP | 2012-163922 A | 8/2012 |

\* cited by examiner

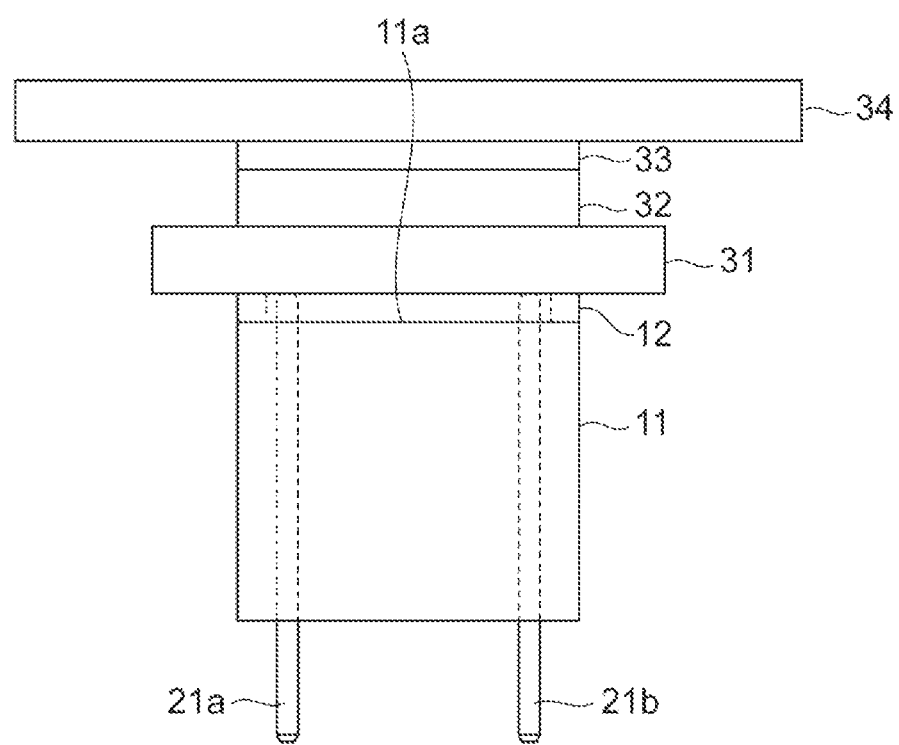

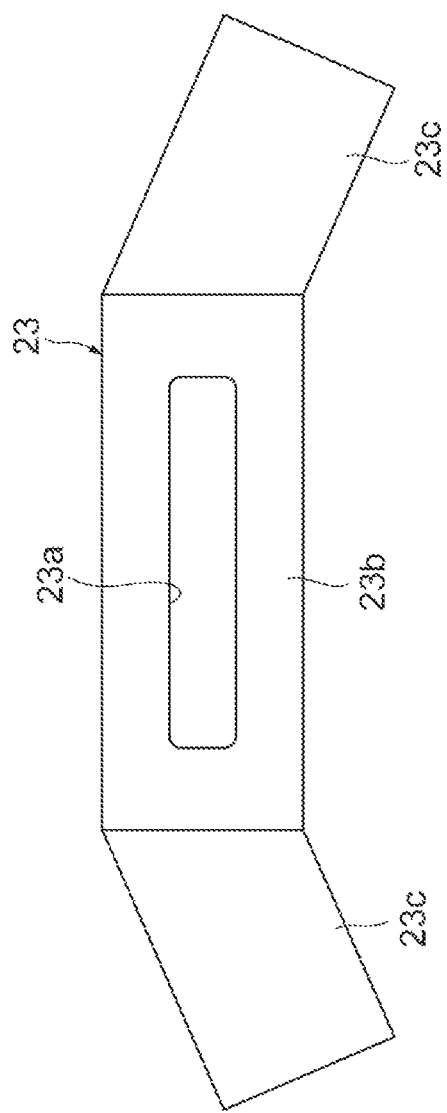

OPTICAL CONNECTOR FERRULE AND OPTICAL CONNECTION STRUCTURE

TECHNICAL FIELD

The present invention relates to an optical connector ferrule and an optical connection structure.

BACKGROUND ART

Patent Literature 1 discloses a ferrule used for an optical connector connecting a plurality of optical fibers to one another. The ferrule includes a plurality of holes for retaining the plurality of optical fibers, an inner plane that makes contact with distal ends of the optical fibers to position the distal ends, a recessed portion provided at forward side of the inner plane in an end surface, and lenses integrally formed with the recessed portion.

CITATION LIST

Patent Literature

Patent Literature 1: U.S. Patent Application Publication No. 2012/0093462

SUMMARY OF INVENTION

Technical Problem

A generally known method for connecting optical fibers to one another with the connector is a Physical Contact (PC) method. FIG. 8A and FIG. 8B are side sectional views illustrating an example of a structure of a ferrule for the PC method. FIG. 8A shows a state before connection, whereas FIG. 8B shows a connected state. A ferrule 100 has a cylindrical exterior and includes a hole 102 for retaining an optical fiber 120, on the central axis. The optical fiber 120 is inserted into the hole 102 and has a distal end slightly projecting outward in a distal end surface 104 of the ferrule 100. In the PC method, the distal end of the optical fiber 120 is brought into physical contact with a distal end of the optical fiber 120 of a mating connector, to be pressed (FIG. 8B), and thereby the optical fibers 120 are optically coupled efficiently to one another. Such a method is mainly used for connecting single optical fiber to one another.

However, such a method has the following problems. Specifically, if the connection is performed while a foreign matter is being attached on a ferrule end surface, the foreign matter adheres to the ferrule end surface due to the pressing force. It is necessary to use a contact type cleaner to remove the adhered foreign matter, and necessary to frequently perform cleaning to prevent adhesion of a foreign matter. In addition, when a plurality of optical fibers is simultaneously connected, a predetermined pressing force is required for each optical fiber, and thus, the larger the number of the optical fibers, the greater the force that is required for the connection.

To solve the above-mentioned problems, for example, as described in Patent Literature 1, an interval is provided between distal end surfaces of optical fibers connected to one another, and a lens is disposed in the interval. FIG. 9 is a side sectional view schematically illustrating an example of such a structure of a ferrule. A ferrule 200 includes a plurality of holes 202 for retaining a plurality of optical fibers 120, an inner plane 204 making contact with distal ends of the plurality of optical fibers and positioning the distal ends, and a lens 208 provided at forward side of the inner plane 204 in an end surface 205. In such a structure, a position of the lens 208 needs to be precisely aligned in addition to the optical fibers 120. Accordingly, the number of components that require alignment work increases and a positional error (tolerance) allowed for each component becomes strict, and therefore the alignment process becomes complicated and is prolonged.

The present invention aims to provide an optical connector ferrule in which cleaning of a ferrule end surface is easy, a large force is not required for connection even when a plurality of optical fibers is simultaneously connected, and the alignment work is easy.

Solution to Problem

An optical connector ferrule according to an embodiment of the present invention comprises: a body including a flat ferrule end surface facing a corresponding optical connector and an optical fiber retaining hole opened in the ferrule end surface, an optical fiber being inserted and retained in the optical fiber retaining hole; and a spacer joined to the body, at least a portion of the spacer being disposed on the ferrule end surface to define an interval between the ferrule end surface and the corresponding optical connector, the spacer including an opening that allows an optical path extending from the optical fiber to pass therethrough.

Advantageous Effects of Invention

According to the present invention, it is possible to provide an optical connector ferrule in which cleaning of a ferrule end surface is easy, a large force is not required for connection even when a plurality of optical fibers is simultaneously connected, and the alignment work is easy.

BRIEF DESCRIPTION OF DRAWINGS

FIG. 5B schematically illustrates a process for joining the spacer to the body, as the example of the method of producing the optical connector ferrule of the embodiment.

FIG. 7A is a developed plan view of a spacer according to a second modification

DESCRIPTION OF EMBODIMENTS

Description of Embodiment of Present Invention

Figure 1:
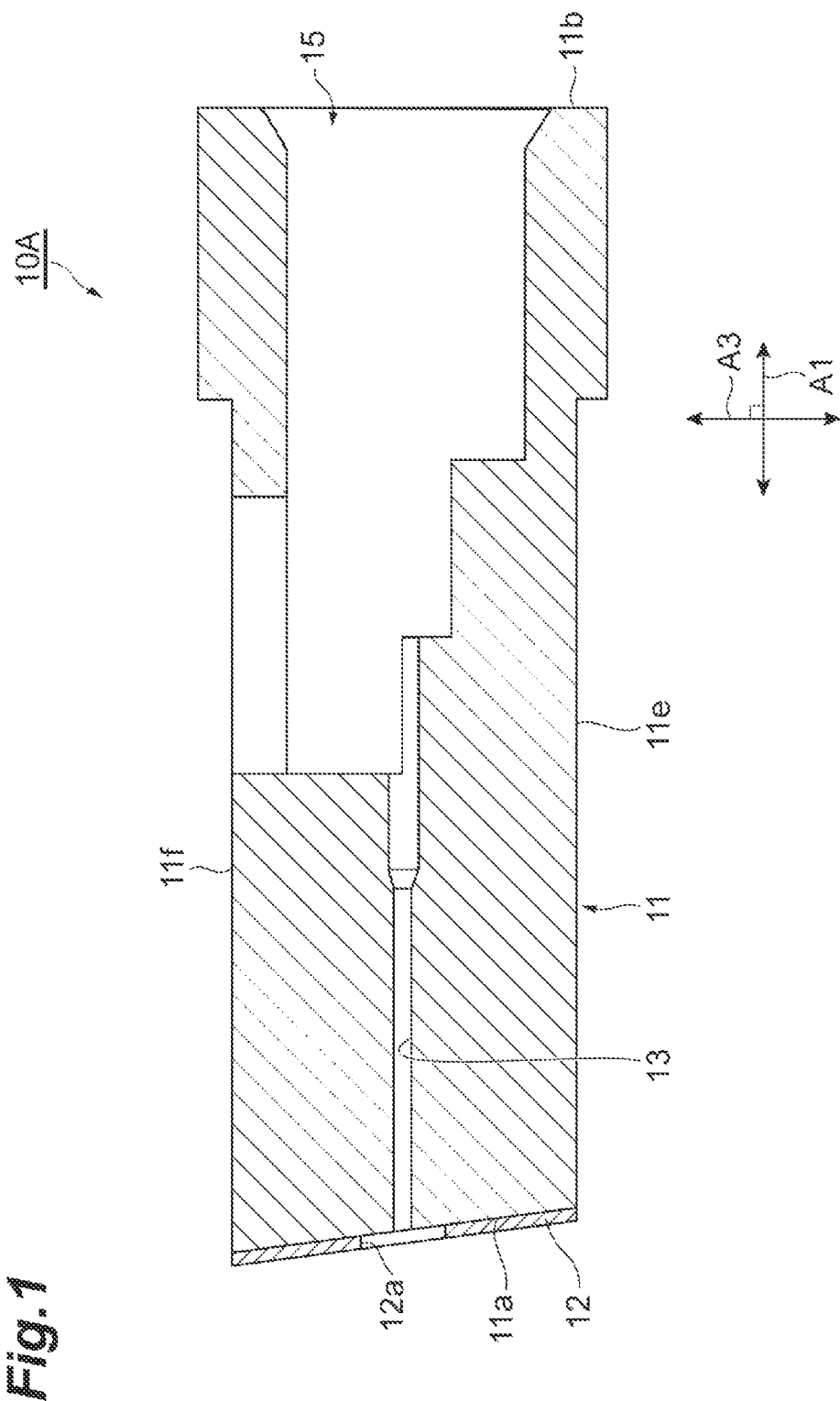
FIG. 1 is a side sectional view illustrating a structure of an optical connector ferrule according to an embodiment of the present invention.

First, features of embodiments of the present invention will be listed and described below. An optical connector ferrule according to an embodiment of the present invention comprises: a body including a flat ferrule end surface facing a corresponding optical connector and an optical fiber retaining hole opened in the ferrule end surface, an optical fiber being inserted and retained in the optical fiber retaining hole; and a spacer joined to the body, at least a portion of the spacer being disposed on the ferrule end surface to define an interval between the ferrule end surface and the corresponding optical connector, the spacer including an opening that allows an optical path extending from the optical fiber to pass therethrough.

In the above-mentioned optical connector ferrule, the spacer defining the interval with respect to the corresponding optical connector is provided on the ferrule end surface. This makes it possible to have a desirable interval between the ferrule end surface and the corresponding optical connector. Accordingly, it is possible to achieve a non-contact optical connection structure and facilitate cleaning of the ferrule end surface (or dispense with the cleaning). Further, unlike the PC method, a large force is not required for connection, and a plurality of optical fibers can be simultaneously connected. Moreover, since the optical fiber retaining hole is opened in the ferrule end surface, a distal end surface of the optical fiber is exposed at the ferrule end surface and is optically coupled with the optical fiber of the corresponding optical connector without using a lens. As a result, the number of optical members present in an optical path can be reduced, and optical connection loss can be reduced.

In the above-mentioned optical connector ferrule, the body may further include a pair of guide holes opened at respective positions sandwiching the optical fiber retaining hole in the ferrule end surface, guide pins being inserted into the respective guide holes, and an inner edge of the opening may make contact with edges of the guide holes when viewed from an axial direction of the pair of guide holes. In this case, when the optical connector ferrule is produced, in a state where stick-like jigs such as guide pins are inserted into the pair of guide holes, the jigs are passed through the opening of the spacer, and the spacer is arranged on the ferrule end surface while bringing the inner edge of the opening into contact with the jigs. This makes it possible to easily and accurately position the spacer with respect to the body.

In the above-mentioned optical connector ferrule, the spacer may be made of resin or metal. This makes it possible to achieve a spacer capable of being joined to the body easily and defining an interval with respect to the corresponding optical connector.

In the above-mentioned optical connector ferrule, the spacer may be adhered to the body with an adhesive. Alternatively, in the above-mentioned optical connector ferrule, the spacer and the body may be made of resin and the spacer may be welded to the body. With any of these configurations, the spacer can be easily joined to the body.

In the above-mentioned optical connector ferrule, the spacer may include a first portion facing the ferrule end surface and a second portion extending along a side surface of the body, and the first portion may not be joined to the ferrule end surface and the second portion may be joined to the side surface. This makes it possible to avoid influence by joining with the spacer on the ferrule end surface (e.g., inflow of an adhesive to the optical fiber retaining hole).

In the above-mentioned optical connector ferrule, the thickness of the spacer may be less than or equal to 100 μm. By defining an interval between the ferrule end surface and the corresponding optical connector with such a thin spacer, a distance between the optical fiber inserted into the optical connector ferrule and the optical fiber of the corresponding optical connector shortens, and these optical fibers can be connected to one another with low coupling loss despite the configuration without a lens.

Further, in the above-mentioned optical connector ferrule, the optical fiber retaining hole may include a plurality of holes. As described above, according to the above-mentioned optical connector ferrule, a large force is not required for connection, and a plurality of optical fibers can be simultaneously connected.

Detail of Embodiment of Present Invention

Specific examples of the optical connector ferrule according to the embodiment of the present invention will be described below, with reference to the drawings. Here, the present invention is not limited to these examples, and it is intended that all modifications in meanings and scopes shown in the claims and equivalent to the scope of the claims are included. In the following description, identical reference numerals are assigned to identical elements, in the description of the drawings, and the redundant description is omitted.

Figure 2:
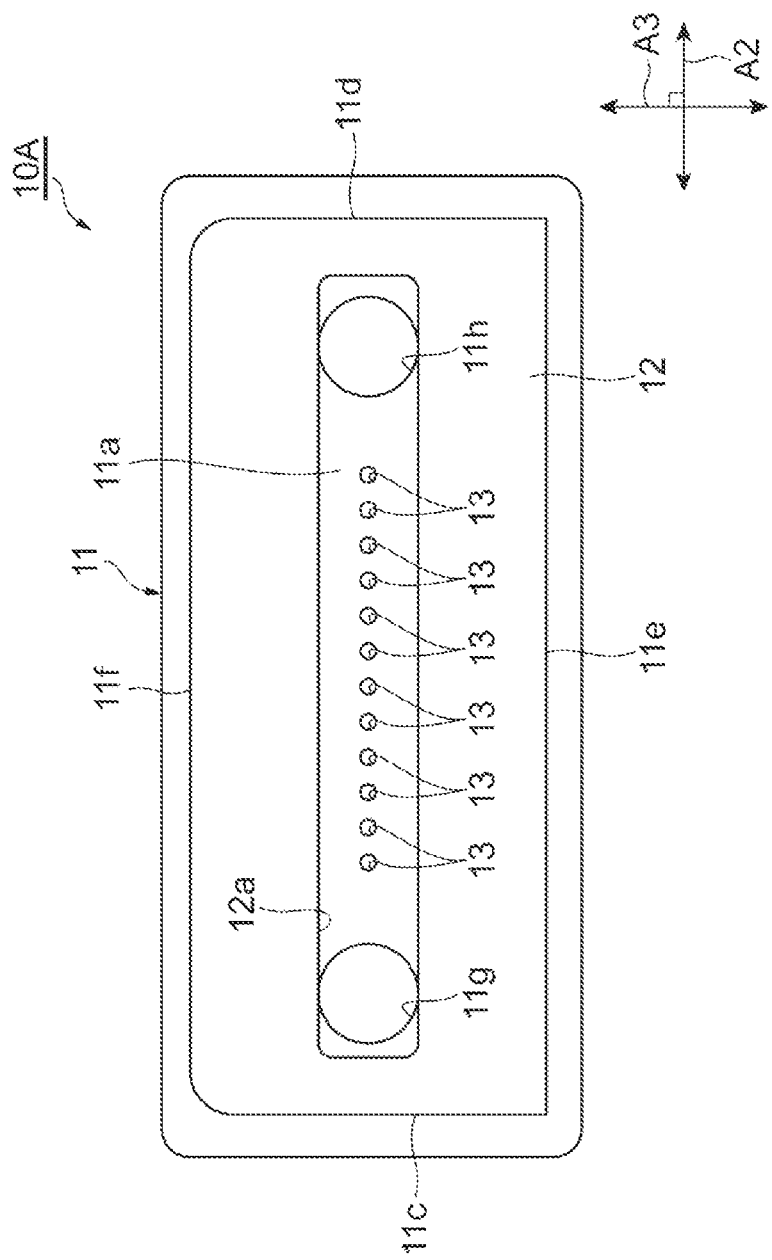
FIG. 2 is a front view of the optical connector ferrule seen from a connection direction.

FIG. 1 is a side sectional view illustrating a structure of an optical connector ferrule 10A according to an embodiment of the present invention and shows a cross section along a connection direction A1 (i.e., optical axis direction of an optical fiber). FIG. 2 is a front view of the optical connector ferrule 10A seen from the connection direction A1.

The optical connector ferrule 10A includes a body 11 and a spacer 12. The body 11 has a substantially parallelepiped exterior and is formed by, for example, resin. The body 11 includes a flat ferrule end surface 11a that is provided at one end in the connection direction A1 and faces a corresponding optical connector, and a back end surface 11b that is provided at the other end. In addition, the body 11 includes a pair of side surfaces 11c, 11d extending along the connection direction A1, a bottom surface 11e, and a top surface 11f. An introduction hole 15 collectively receiving a plurality of optical fibers is formed in the back end surface 11b. Note that these optical fibers are introduced in the form of, for example, a 0.25 mm coated fiber, a 0.9 mm jacketed fiber, or a tape fiber.

The body 11 further includes a plurality of optical fiber retaining holes 13. The optical fiber retaining holes 13 penetrate from the introduction hole 15 to the ferrule end surface 11a, and the front ends thereof are opened in the ferrule end surface 11a. Openings of the optical fiber retaining holes 13 are aligned in one row along a direction A2 crossing the connection direction A1. These optical fiber retaining holes 13 retain inserted optical fibers.

The body 11 further includes a pair of guide holes 11g, 11h. A pair of guide pins for fixing a relative position between the optical connector ferrule 10A and an optical connector ferrule of the corresponding optical connector is inserted into the respective guide holes 11g, 11h. The pair of guide holes 11g, 11h extend with the connection direction A1 as a central axial line and is aligned along the direction A2. Furthermore, the guide holes 11g, 11h are opened in the ferrule end surface 11a, and openings thereof are provided at respective positions sandwiching the optical fiber retaining holes 13 (in other words, at both ends of the row of optical fiber retaining holes 13).

The spacer 12 is a film shape (thin film shape) member, and at least a portion thereof is disposed on the ferrule end surface 11a and is sandwiched between the ferrule end surface 11a and the corresponding optical connector, thereby defining an interval between the ferrule end surface 11a and a ferrule end surface of the corresponding optical connector. At least a portion of the spacer 12 is joined to any point of the body 11. The joining of the spacer 12 with the body 11 is performed by, for example, adhesion via an adhesive, or welding (such as laser welding). When materials of the spacer 12 and the body 11 are different from each other (e.g., metal and resin, etc.), an adhesive is used, whereas when the materials of the spacer 12 and the body 11 are the same, (e.g., both materials are resin), welding is preferable. This is because when a linear expansion coefficient is different between the spacer 12, the body 11 and the adhesive, there is a concern that the spacer 12 is peeled off from the body 11 with change in temperature; however, there is not such a concern in welding, and reliability is enhanced. Note that in this embodiment, the spacer 12 is provided only on the ferrule end surface 11a and the spacer 12 is joined to the ferrule end surface 11a.

The spacer 12 has an opening 12a formed on the ferrule end surface 11a. The opening 12a exposes the openings of the optical fiber retaining holes 13 in order to pass a plurality of optical paths extending between each distal end surfaces of the optical fibers retained by the respective optical fiber retaining holes 13 and distal end surfaces of the optical fibers of the corresponding optical connector. In an example, the opening 12a is formed, with the direction A2 as a longitudinal direction. The length of the opening 12a in the direction A2 is, for example, 5.31 mm, and the width in the direction A3 crossing the direction A2 is, for example, 0.71 mm.

The dimension of the spacer 12 is the same as the dimension of the ferrule end surface 11a or smaller. This makes it possible to prevent the peeling off of the spacer 12 due to the peripheral part of the spacer 12 being caught. The thickness of the spacer 12 is greater than or equal to 5 μm, for example. Moreover, the thickness of the spacer 12 is less than or equal to 100 μm, for example, and more preferably 25 μm or less. With this, an interval between the ferrule end surface 11a and the ferrule end surface of the corresponding optical connector is defined to 5 μm or greater and 100 μm or less. Although the constituent material of the spacer 12 is not particularly limited and usable examples thereof include various kinds of materials, it is preferable that the spacer 12 is made of resin (e.g., polyphenylene sulfide (PPS)) or metal.

Further, the inner edge of the opening 12a of the spacer 12 is in contact with edges of the guide holes 11g, 11h when viewed from the axial direction of the guide holes 11g, 11h (i.e., the connection direction A1). In the embodiment, in particular, each of a pair of the inner edges along the direction A2 of the opening 12a is in contact with the edges of the guide holes 11g, 11h. Note that the expression "make contact with the edges" means that portions of the pair of inner edges of the opening 12a substantially overlap with (coincide with) the edges when viewed from the axial direction of the guide holes 11g, 11h. Accordingly, when the guide pins are inserted into the guide holes 11g, 11h, the outer peripheral surfaces of the guide pins and the inner edges of the opening 12a make contact with each other.

Figure 3:
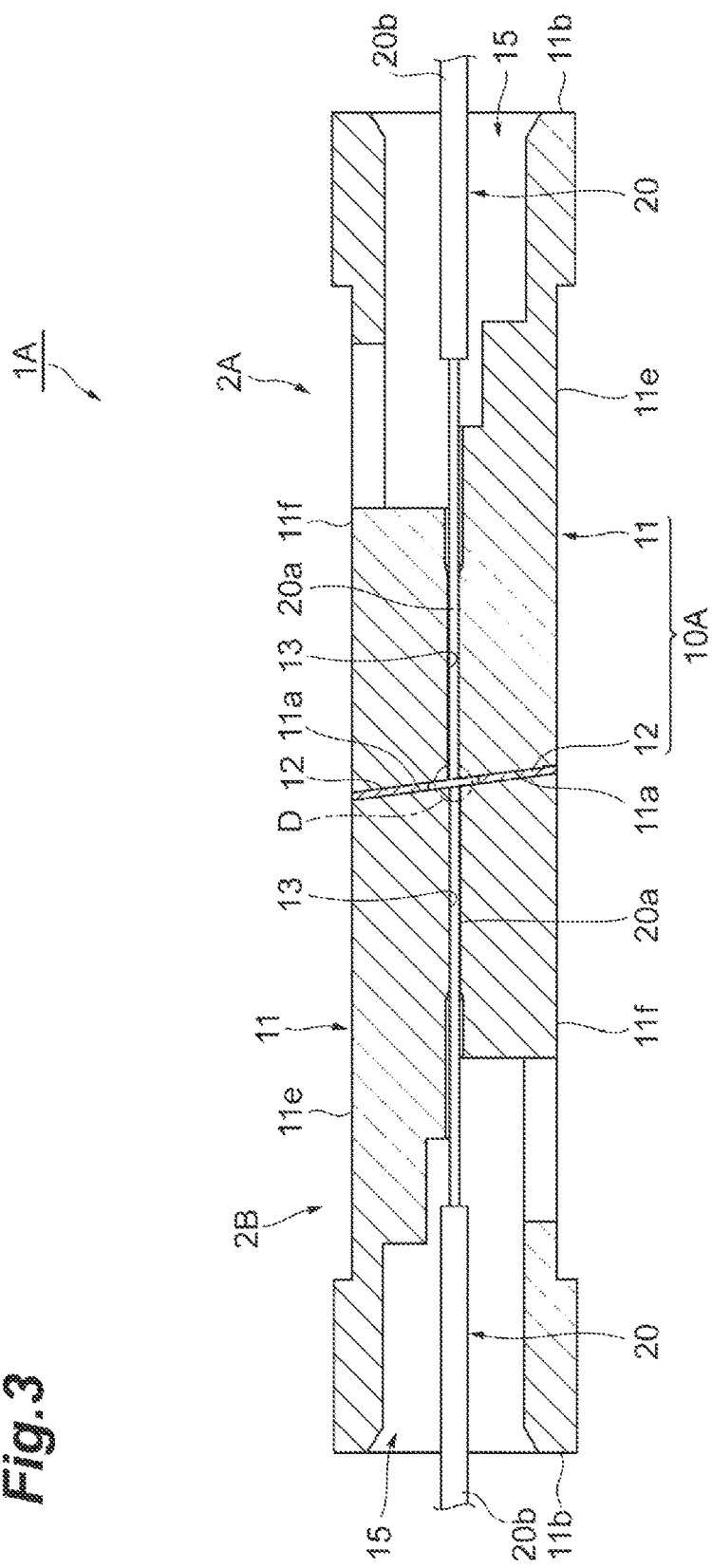
FIG. 3 is a side sectional view illustrating an optical connection structure including an optical connector having the optical connector ferrule of the embodiment and a corresponding optical connector.

FIG. 3 is a side sectional view illustrating an optical connection structure 1A including an optical connector 2A having the optical connector ferrule 10A of the embodiment and a corresponding optical connector 2B. The optical connector 2A further includes a plurality of optical fibers 20a in addition to the optical connector ferrule 10A. Further, the corresponding optical connector 2B includes the body 11 as an optical ferrule and a plurality of the optical fibers 20a. In the optical connection structure 1A, the ferrule end surface 11a of the body 11 of the optical connector 2A and the ferrule end surface 11a of the body 11 of the corresponding optical connector 2B face one another.

Each of the plurality of optical fibers 20a extends along the connection direction A1. Each of the optical fibers 20a is covered with a resin coating 20b and constitute a coated fiber 20, and the resin coating 20b is removed from the middle part in the connection direction A1 to distal ends of the optical fiber 20a, and thereby a portion thereof is exposed. These optical fibers 20a are inserted into the respective optical fiber retaining holes 13 of the body 11 and retained.

As described above, the spacer 12 is sandwiched between the ferrule end surface 11a of the optical connector 2A and the ferrule end surface 11a of the corresponding optical connector 2B and thereby defines the interval between these ferrule end surfaces 11a. Accordingly, a surface of the spacer 12 is in contact with the ferrule end surface 11a of the corresponding optical connector 2B. Further, the optical fibers 20a of the optical connector 2A and the optical fibers 20a of the corresponding optical connector 2B are optically coupled via the opening 12a of the spacer 12.

Figure 4:
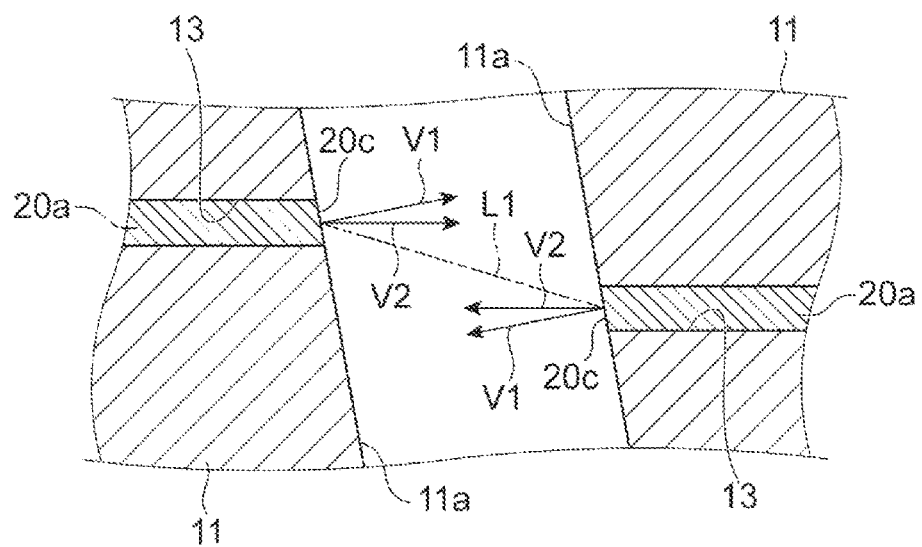
FIG. 4 is an enlarged sectional view illustrating a portion D shown in FIG. 3.

FIG. 4 is an enlarged sectional view illustrating a portion D shown in FIG. 3. As shown in FIG. 4, a distal end surface 20c of each of the optical fibers 20a is exposed in the ferrule end surface 11a and preferably flushes with the ferrule end surface 11a. In addition, in a cross section along the optical axis of each of the optical fiber 20a, a normal direction V1 of the distal end surface 20c of the optical fiber 20a and the ferrule end surface 11a inclines with respect to an optical axis direction V2 of the optical fiber 20a. With this, back-reflected light in the distal end surface 20c is reduced. In this case, an optical path L1 of light emitted from the distal end surface 20c of the optical fiber 20a is refracted in an opposite direction of the inclination of the distal end surface 20c, in the distal end surface 20c. As a result, a central axis line of the optical fiber 20a of the optical connector 2A and a central axis line of the optical fiber 20a of the corresponding optical connector 2B are offset from each other in a refractive direction.

Moreover, the distal end surface 20c of the optical fiber 20a of the optical connector 2A and the distal end surface 20c of the optical fiber 20a of the corresponding optical connector 2B are optically coupled directly to one another without using an optical element, such as a lens, a refractive index matching agent, or the like (only via air). Accordingly, light emitted from the distal end surface 20c of one of the optical connectors is incident on the distal end surface 20c of the other optical connector while slightly spreading.

Figure 5A:
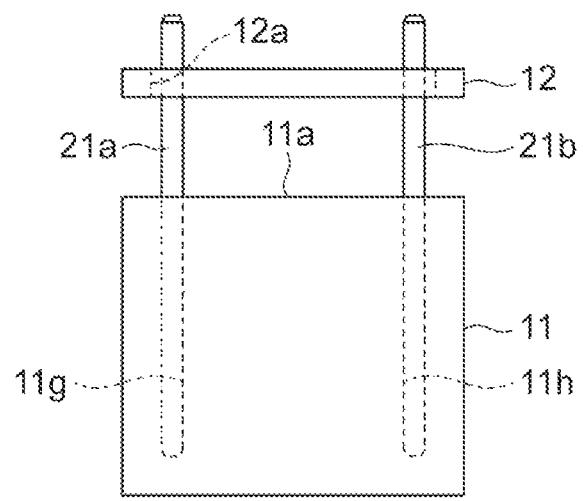
FIG. 5A schematically illustrates a process for joining a spacer to a body, as an example of a method of producing the optical connector ferrule of the embodiment.

FIG. 5A and FIG. 5B schematically illustrate a process for joining the spacer 12 to the body 11, as an example of a method of producing the optical connector ferrule 10A of the embodiment. Note that here the spacer 12 and the body 11 are described as being made of resin (preferably made of the same material).

First, as shown in FIG. 5A, stick-like jigs 21a, 21b are inserted into the guide holes 11g, 11h of the body 11. Guide pins may be used as the stick-like jigs 21a, 21b. Thereafter, the stick-like jigs 21a, 21b are passed though the opening 12a of the spacer 12, and the spacer 12 is moved onto the ferrule end surface 11a of the body 11. As described above, the inner edges of the opening 12a are in contact with edges of the guide holes 11g, 11h when viewed from the connection direction A1, and thus, at this time, the inner edges of the opening 12a make contact with the outer peripheral surfaces of the stick-like jigs 21a, 21b. Accordingly, the relative positions between the stick-like jigs 21a, 21b and the spacer 12, and consequently, the relative position between the body 11 and the spacer 12 are easily and accurately positioned.

Sequentially, as shown in FIG. 5B, a plate-like jig 31, an elastic jig 32, an optical mask 33, and a plate-like jig 34 are placed on the spacer 12 in this order. While applying pressure with the plate-like jig 34 to suppress a displacement of the spacer 12, laser light is applied from above, thereby welding the spacer 12 and the ferrule end surface 1a of the body 11 to one another. At this time, the elastic jig 32 absorbs a relative inclination between the plate-like jig 31 and the plate-like jig 34. Further, the optical mask 33 protects at least the optical fiber retaining holes 13 from the laser light irradiation. For example, the optical mask 33 protects, from the laser light irradiation, a region that is narrower than the opening 12a of the spacer 12 and that may cover all the optical fiber retaining holes 13.

The plate-like jig 31, the elastic jig 32, and the plate-like jig 34 are composed of members that transmit at least a wavelength of the laser light. In one example, the plate-like jig 31 is an acrylic plate having a thickness of 2 mm. In one example, the elastic jig 32 is a silicone film having a thickness of 2 mm. In one example, the plate-like jig 34 is an acrylic plate having a thickness of 10 mm.

The advantageous effects obtained by the aforementioned optical connector ferrule 10A of the embodiment will be described. In the optical connector ferrule 10A, the spacer 12 defining the interval with respect to the corresponding optical connector 2B is provided on the ferrule end surface 11a. This makes it possible to easily provide a predetermined interval between the ferrule end surface 11a and the corresponding optical connector 2B. In particular, in the embodiment, the optical fiber retaining holes 13 are opened in the ferrule end surface 11a, and thus the distal end surfaces 20c of the optical fibers 20a are exposed in the ferrule end surface 11a and are optically coupled to the optical fibers 20a of the corresponding optical connector 2B without using a lens. In that case, in order to prevent the spreading of the light to maintain coupling efficiency, it is necessary to keep the interval between the ferrule end surfaces 11a small. According to the embodiment, usage of the film-shaped spacer 12 achieves such a small interval easily and accurately. Accordingly, it is possible to achieve a non-contact optical connection structure and facilitate cleaning of the ferrule end surface 11a (or dispense with the cleaning).

According to the embodiment, unlike the PC method, a large force is not required for connection, and the plurality of optical fibers 20a can be simultaneously connected. Moreover, as described above, the optical fibers 20a are optically coupled with the optical fibers 20a of the corresponding optical connector 2B without using a lens, and therefore the number of optical members present in the optical paths can be reduced, and optical connection loss can be reduced. In addition, it is possible to facilitate the alignment process and reduce the number of production steps, thereby reducing the cost.

Although it is also conceivable to integrally form a recessed portion corresponding to the opening 12a to a ferrule end surface, in such a configuration, it is difficult to polish the ferrule end surface and an optical fiber distal end surface. According to the embodiment, the spacer 12 only has to be joined after polishing the ferrule end surface 11a and the distal end surface 20c, and such a problem does not arise.

The spacer 12 may be made of resin or made of metal as with the embodiment. This achieves the spacer 12 capable of being easily joined to the body 11 and accurately defining the interval with respect to the corresponding optical connector 2B.

As with the embodiment, when the spacer 12 and the body 11 are made of resin, the spacer 12 may be welded to the body 11. This makes it possible to easily join the spacer 12 to the body 11. In addition, it is easy to limit the joining point using the optical mask 33 or the like, as compared to when the spacer 12 is adhered to the body 11 using an adhesive, and therefore it is possible to easily minimizing influence on the optical fiber retaining holes 13 and guide holes 11g, 11h.

As with the embodiment, the thickness of the spacer 12 may be less than or equal to 100 μm. By defining the interval between the ferrule end surface 11a and the corresponding optical connector 2B with such a thin spacer 12, a distance between the optical fiber 20a inserted into the optical connector ferrule 10A and the optical fiber 20a of the corresponding optical connector 2B shortens, and these optical fibers 20a can be connected to one another with low coupling loss despite the configuration without using a lens.

As with the embodiment, a plurality of the optical fiber retaining holes 13 may be provided. As described above, according to the optical connector ferrule 10A of the embodiment, a large force is not required for connection, and the plurality of optical fibers 20a can be simultaneously connected.

In the embodiment, each normal direction of the distal end surface 20c of the optical fiber 20a and the ferrule end surface 11a inclines with respect to an optical axis direction of the optical fiber 20a (see FIG. 4). This reduces back-reflected light in the distal end surface 20c of the optical fiber 20a. In addition, the spacer 12 and the body 11 are independent separate members, and thus the inclined ferrule end surface 11a and the distal end surface 20c of the optical fiber 20a can be easily formed by polishing or the like.

First Modification

Figure 6:
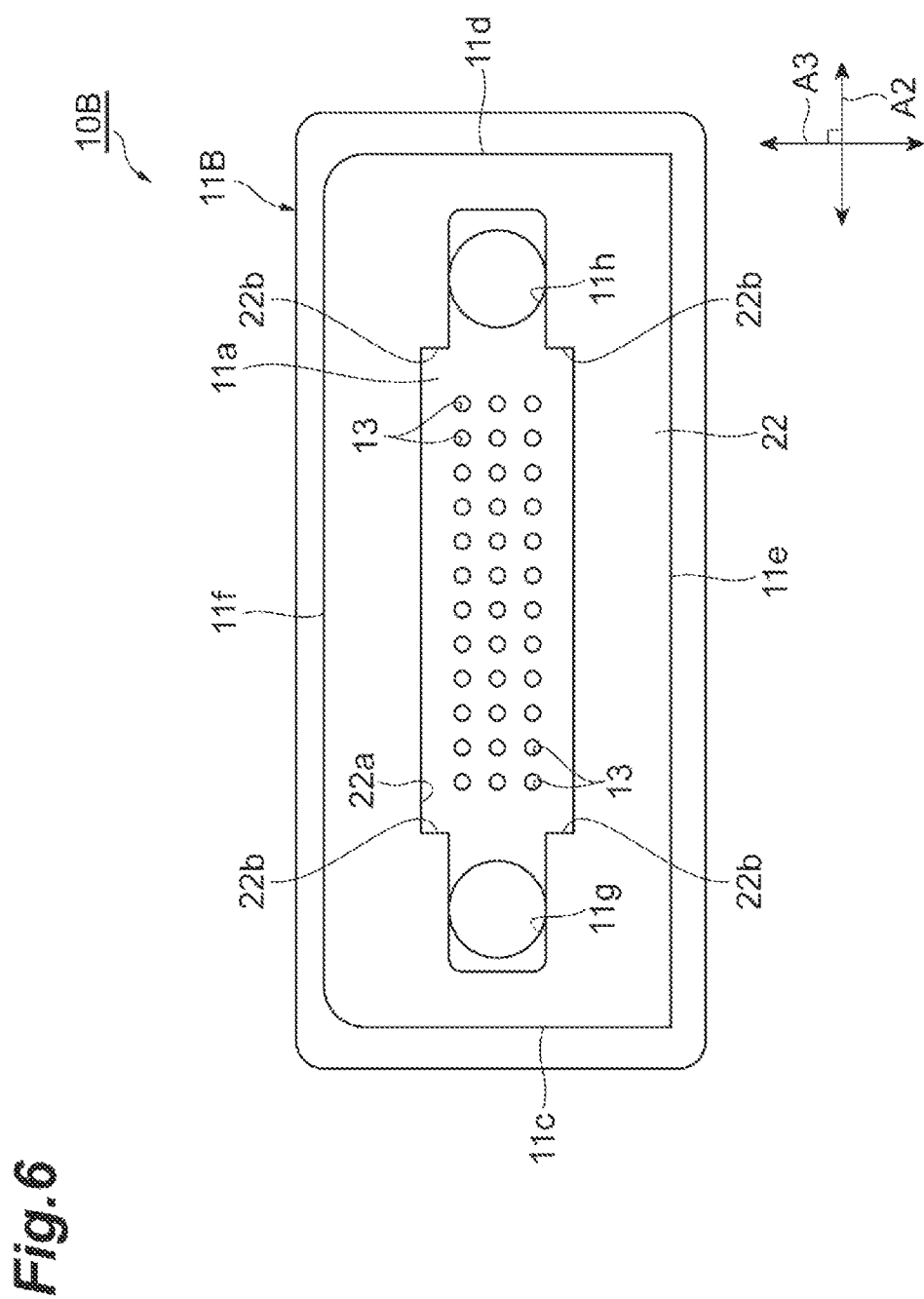
FIG. 6 is a front view of an optical connector ferrule according to a first modification.

FIG. 6 is a front view of an optical connector ferrule 10B according to a first modification. The optical connector ferrule 10B of this modification includes a body 11B and a spacer 22. The body 11B has a larger number of optical fiber retaining holes 13 than the above embodiment. These optical fiber retaining holes 13 constitute a plurality of rows (3 rows in FIG.) of the optical fiber retaining holes. That is, in each row, the plurality of the optical fiber retaining holes 13 are aligned along the direction A2, and each of the rows is aligned in the direction A3. Note that except for this, the configuration of the body 11B is the same as that of the body 11 of the above embodiment.

The spacer 22 has an opening 22a. In the modification, the plurality of rows of optical fiber retaining holes 13 are aligned, and thus the width of the opening 22a in the direction A3 is greater than the width of the opening 12a in the same direction (see FIG. 2). Moreover, inner edges at both end parts of the opening 22a in the direction A2 overlap with the edges of the guide holes 11g, 11h, and accordingly the widths of both end parts in the direction A3 are equal to that width of the opening 12a. As a result, steps 22b are provided to the inner edges of the opening 22a. Note that except for this, the configuration of the spacer 22 is the same as that of the spacer 12 of the above embodiment.

The shape of the opening of the spacer is not limited to the above-mentioned embodiment and can be various shapes such as a shape like the opening 22a of the modification, for example. In addition, the opening of the spacer is not necessary to be closed and a part thereof may reach outer edge of the spacer. Whatever shape the opening has, advantageous effect of the above-mentioned embodiment can be preferably obtained.

Second Modification

Figure 7B:
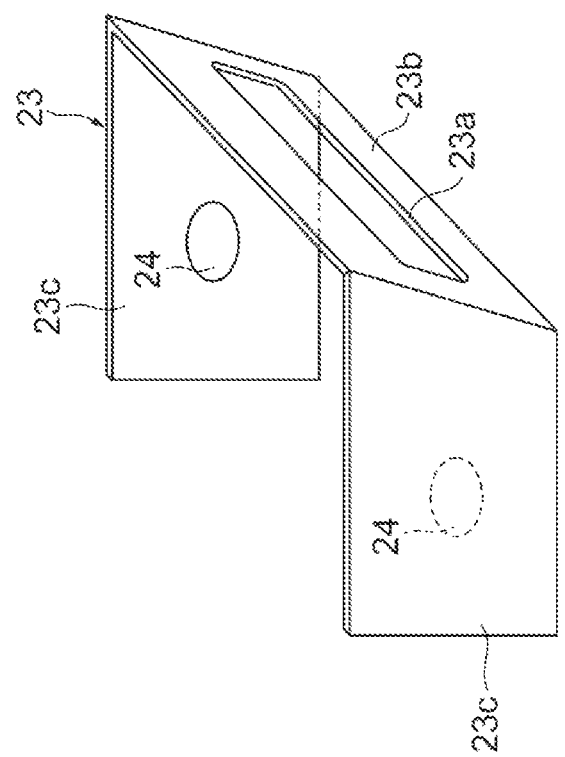
FIG. 7B is a perspective view of the spacer according to the second modification.
Figure 8A:
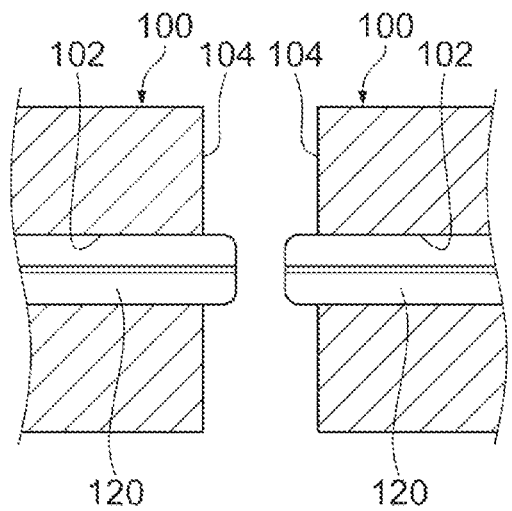
FIG. 8A is a side sectional view illustrating an example of a structure of a ferrule for the PC method.
Figure 8B:
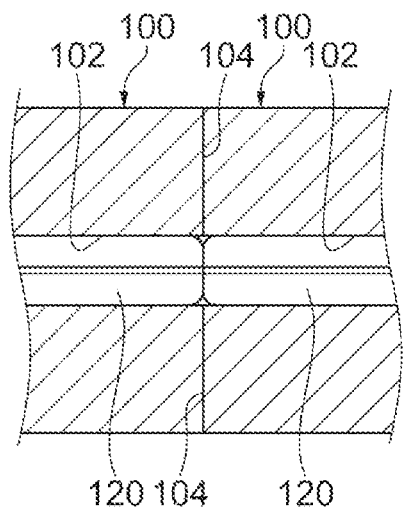
FIG. 8B is a side sectional view illustrating the example of the structure of the ferrule for the PC method.
Figure 9:
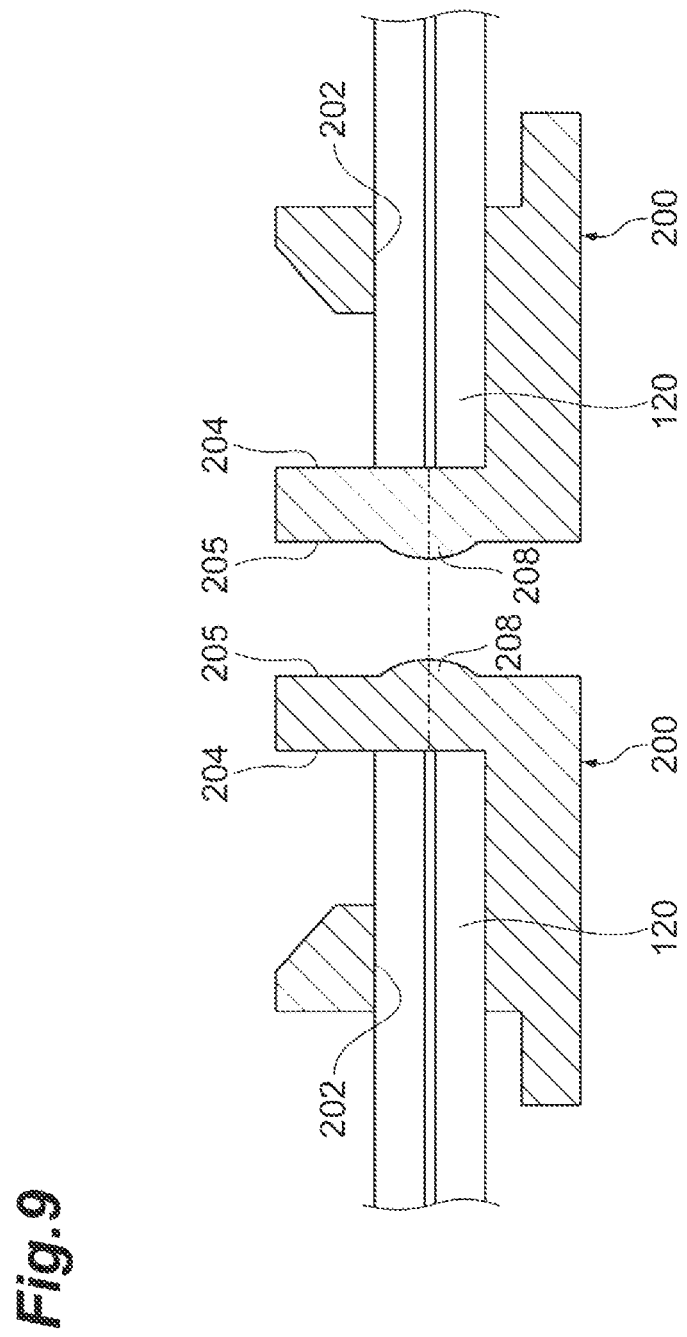
FIG. 9 is a side sectional view schematically illustrating an example of a structure of a ferrule.

FIG. 7A and FIG. 7B illustrate a configuration of a spacer 23 according to a second modification. FIG. 7A is a developed plan view of the spacer 23 and FIG. 7B is a perspective view of the spacer 23. The spacer 23 of this modification includes a first portion 23b facing the ferrule end surface 11a and a pair of second portions 23c extending along the side surfaces 11c, 11d of the body 11 (see FIG. 2). The opening 23a is formed in the first portion 23b and has the same shape as that of the opening 12a of the above-mentioned embodiment. In addition, the first portion 23b is not joined to the ferrule end surface 11a, and the pair of second portions 23c is joined to the side surfaces 11c, 11d of the body 11. The pair of second portions 23c may be adhered to the respective side surfaces 11c, 11d with an adhesive 24, or may be welded to the respective side surfaces 11c, 11d by laser light.

According to this modification, influence by joining with the spacer on the ferrule end surface 11a can be avoided. In particular, when the spacer and the body 11 are adhered by an adhesive, it is probable that the optical fiber retaining holes 13 are blocked by inflow of the adhesive to the optical fiber retaining holes 13. According to the modification, the spacer 23 is not adhered to the ferrule end surface 11a, and thus it is possible to avoid the inflow of the adhesive to the optical fiber retaining holes 13. Such a configuration is preferable, particularly when the spacer 23 and the body 11 are made of different materials (e.g., the spacer 23 is made of metal and the body 11 is made of resin). This is because, in such a case, the spacer 23 and the body 11 cannot be welded and therefore need to be adhered.

The optical connector ferrule according to the present invention is not limited to the aforementioned embodiment, but can be modified in various ways. For example, the aforementioned embodiment and modifications may be combined with each other in accordance with the required purpose and advantageous effect. Further, although, in the above-described embodiment, the interval between the ferrule end surfaces is filled with air, it is not limited to the air, so long as the medium has a constant refractive index. Furthermore, although, in the above-described embodiment, the present invention is applied to a multi-fiber optical connector, it is applicable also to a single-fiber optical connector. Moreover, although, in the above-described embodiment, the normal direction of the optical fiber distal end surface and the ferrule end surface inclines with respect to the optical axis direction of the optical fiber, the normal direction and the optical direction may coincide with each other.

REFERENCE SIGNS LIST

1A . . . optical connection structure, 2A . . . optical connector, 2B . . . corresponding optical connector, 10A, 10B . . . optical connector ferrule, 11, 11B . . . body, 11a . . . ferrule end surface, 11g, 11h . . . guide hole, 12, 22, 23 . . . spacer, 12a, 22a, 23a . . . opening, 13 . . . optical fiber retaining hole, 15 . . . introduction hole, 20 . . . coated fiber, 20a . . . optical fiber, 20b . . . resin coating, 20c . . . distal end surface, 21a, 21b . . . stick-like jig, 23b . . . first portion, 23c . . . second portion, 24 . . . adhesive, 31 . . . plate-like jig, 32 . . . elastic jig, 33 . . . optical mask, 34 . . . plate-like jig, A1 . . . connection direction

The invention claimed is:

1. An optical connector ferrule comprising:
a body including a flat ferrule end surface provided at one end of the body, and an optical fiber retaining hole opened in the ferrule end surface, the optical fiber retaining hole being configured to have an optical fiber inserted therein and retain the inserted optical fiber; and
a spacer joined to the body, at least a portion of the spacer being disposed on the ferrule end surface with a certain thickness, the spacer including an opening is provided on an extension of center axis of the optical fiber retaining hole,
wherein the spacer and the body are made of resin, and the spacer is welded to the body.

2. The optical connector ferrule according to claim 1, wherein the body further includes a pair of guide holes opened at respective positions sandwiching the optical fiber retaining hole in the ferrule end surface, the guide holes being configured to insert guide pins therein, and an inner edge of the opening is in contact with edges of the guide holes when viewed from an axial direction of the pair of guide holes.

3. The optical connector ferrule according to claim 1, wherein the spacer is provided only on the ferrule end surface of the body.

4. The optical connector ferrule according to claim 1, wherein the spacer includes a first portion facing the ferrule end surface and a second portion extending along a side surface of the body, and the first portion is not joined to the ferrule end surface, and the second portion is joined to the side surface.

5. The optical connector ferrule according to claim 1, wherein the thickness of the spacer is less than or equal to 100 μm.

6. The optical connector ferrule according to claim 1, wherein the optical fiber retaining hole includes a plurality of holes.

7. The optical connector ferrule according to claim 1, wherein a dimension of the spacer is the same as or smaller than a dimension of the ferrule end surface.

8. An optical connection structure comprising:
a first optical connector including the optical connector ferrule according claim 1; and
a second optical connector facing the first optical connector via the spacer.

9. The optical connection structure according to claim 8, wherein the first connector includes at least one first optical fiber and the second optical connector includes at least one second optical fiber, and the first optical fiber and the second optical fiber are optically coupled inside the opening of the spacer.

10. The optical connection structure according to claim 9, wherein a central axis line of the first optical fiber and a central axis line of the second optical fiber are offset from each other in a refractive direction.

11. The optical connector ferrule according to claim 1, wherein the thickness of the spacer is greater than or equal to 5 μm and less than or equal to 25 μm.

12. The optical connector ferrule according to claim 1, wherein the ferrule end surface inclines with respect to the center axis of the optical fiber retaining hole.

13. The optical connector ferrule according to claim 1, wherein the resin is polyphenylene sulfide (PPS).

14. The optical connector ferrule according to claim 1, wherein the spacer is a film shape member.

15. An optical connector comprising:
the optical connector ferrule according to claim 1; and
an optical fiber retained by the optical fiber retaining hole.

* * * * *